Feb. 8, 1966 E. A. CORL 3,233,310

METHOD OF MAKING A TWO-DIMENSION COMPONENT ASSEMBLY

Filed Oct. 9, 1962 2 Sheets-Sheet 1

INVENTOR.
EDWIN A. CORL
BY
Shenier & O'Connor
ATTORNEYS

METHOD OF MAKING A TWO-DIMENSION COMPONENT ASSEMBLY

INVENTOR.
EDWIN A. CORL
BY
Shenier & O'Connor
ATTORNEYS

United States Patent Office 3,233,310
Patented Feb. 8, 1966

3,233,310
METHOD OF MAKING A TWO-DIMENSION COMPONENT ASSEMBLY

Edwin A. Corl, Bethel, Conn., assignor to United Aircraft Corporation, East Hartford, Conn., a corporation of Delaware Filed Oct. 9, 1962, Ser. No. 229,366
5 Claims. (Cl. 29—155.5)

My invention relates to an assembly of connected electrical components and, more particularly, to an improved assembly of conventional two-dimensional and microelectrical components and method of making the same which is simple and reliable.

In the prior art, various methods are known for connecting electrical components. The components may be soldered, welded or crimped to connecting wires, printed wiring parts, or to metal ribbons to make up the required assembly. In techniques of the prior art for accomplishing these operations, many of the joints are individually made and are formed by dipping the joint in molten solder. While these assemblies and methods of the prior art are satisfactory for electrical components of the prior art which have considerble size, the advent of miniature components and molecular circuitry has given rise to some difficulties. In the course of formation of the soldered joint described above, the components themselves and their supports are subject to corrosive fluxes and to very high temperatures which may harm the components and result in networks or assemblies of very low reliability. Owing to the small size of miniature components, great difficulty is involved in making the required connections. Not only is this true but the connections themselves are out of proportion by a large factor in size and weight to the size and weight of the components being connected.

My invention relates to a two-dimensional and microelectrical component assembly and method of making the same which overcomes the difficulties of the prior art pointed out above. By use of my method, an assembly of miniature components may be built up in a relatively rapid and expeditious manner as contrasted with systems of the prior art. My method produces an assembly which is lighter and smaller than are assemblies built up by methods of the prior art. Owing to the fact that the components themselves are protected during the formation of the assembly, the resulting assembly is more reliable than are assemblies made by methods of the prior art.

One object of my invention is to provide an improved two-dimensional and microelectrical component assembly and method of making the same which overcomes the defects of assemblies and methods of the prior art.

Another object of my invention is to provide an improved assembly of miniature components which is more reliable than are assemblies of the prior art.

A further object of my invention is to provide an assembly of miniature components which is smaller and lighter than are assemblies of the prior art.

Still another object of my invention is to provide a method of making an assembly of miniature electrical components in which the components are protected in the course of making the connections.

Other and further objects of my invention will appear from the following description.

In general, my invention contemplates a method of interconnecting electrical components in which I first pass the component leads through tubes of material which is soluble in a solvent, to which the encapsulating material is resistant, in such manner that the tubes or rods, if conductive, would provide the required circuit connections. After encapsulation of the components and connecting rods or tubes, I dissolve the tube material to form channels throughout the assembly along which electrical connections are to be made. I then vapor-deposit a suitable conductive material in the channels to provide the required electrical connections.

In the accompanying drawings which form part of the instant specification and which are to be read in conjunction therewith and in which like reference numerals are used to indicate like parts in the various views.

Figures 1, 2, 4, 6:
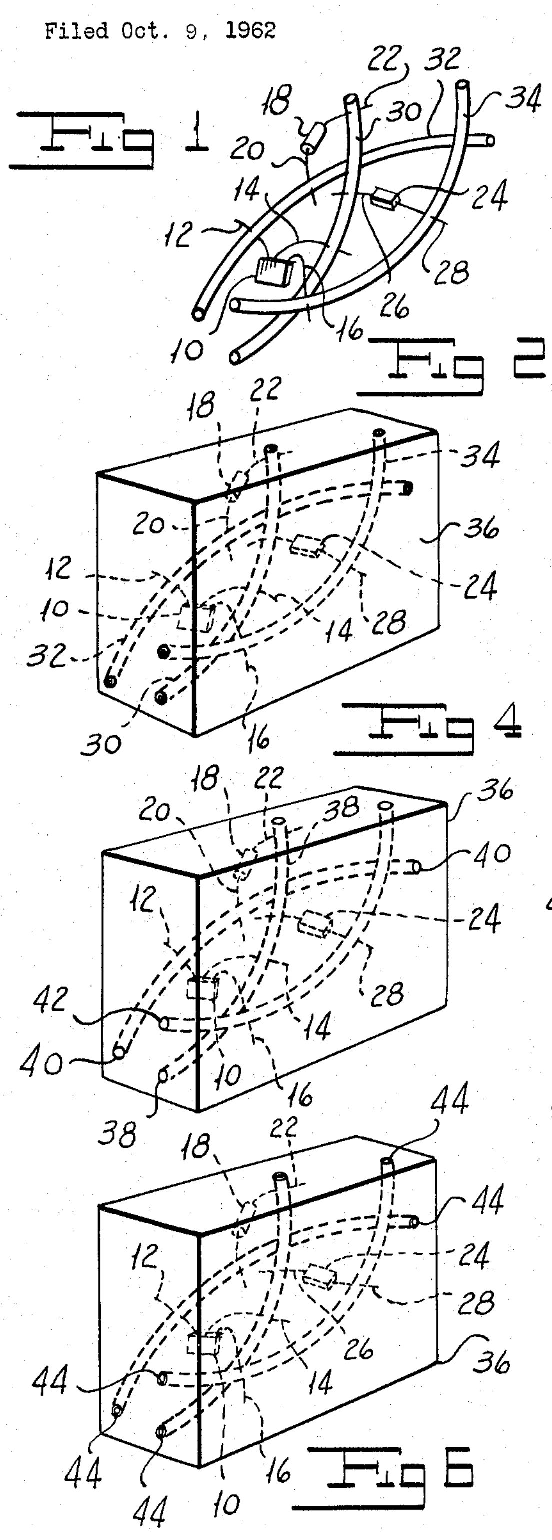
FIGURE 1 is a perspective view illustrating one step in the formation of my improved electrical component assembly.
FIGURE 2 is a perspective view illustrating an intermediate step in the formation of my improved electrical component assembly.
FIGURE 4 is a perspective view illustrating a further step in my method of making my improved electrical component assembly.
FIGURE 6 is a perspective view of my completed improved electrical component assembly.

Referring now to FIGURE 1 of the drawings, I will assume that I wish to connect a transistor 10 having leads 12, 14 and 16 in a predetermined relationship with a resistor 18 having leads 20 and 22 and with a capacitor 24 having leads 26 and 28. In the first step of practicing my method, I take a plurality of tubes or rods 30, 32 and 34 of a suitable material such, for example, as polyvinyl alcohol which is soluble in water and pass the leads of the components through the tubes or rods 30, 32 and 34 in such manner that if the rods were conductive, the desired circuit would be provided. For example, I may insert the leads 12, 14 and 16 through the respective rods 32, 30 and 34. The leads 20 and 22 of the component 18 may be passed through rods 32 and 30. The leads 26 and 28 may be passed through the rods 30 and 34.

I select any suitable material for the rods 30, 32 and 34. This material must be a material which is soluble in a solvent to which the encapsulating material to be described hereinafter is resistant. For example, it could be polyvinyl alcohol which is soluble in water. Alternately, I could use wax which can be melted by heating and any residue removed by washing with a suitable solvent to remove residual volatile hydrocarbons. Any hydrocarbon which can be dissolved by a solvent to which the encapsulating material is resistant could also be used. For example, highly plasticized polyvinyl acetate or polyvinyl butyrate is a suitable material which can be washed out with an organic solvent such as acetone in a vapor-degreasing or ultrasonic system.

After having connected the components 10, 18 and 24 by means of tubes or rods 30, 32 and 34 in a manner described above, I coat the assembly with any suitable resin to hold the components in place during the encapsulating operation. I next encapsulate the assembly shown in FIGURE 1 to the desired shape, such as that of a block shown in FIGURE 2. I may employ any appropriate material as the encapsulant 36. A hydrocarbon resin such, for example, as an epoxy resin, a polyester resin, or a polysulfide resin may be used for this purpose. Potting compounds of this type are well known in the art.

After having formed the block 36 carrying the rods 30, 32 and 34 and the components 10, 18 and 24, I immerse the intermediate assembly in a solvent for the rods, to which solvent the potting material 36 is resistant. For example, where the rods 30, 32 and 34 are made from polyvinyl alcohol, I immerse the block in water to dissolve the rods to form channels 38, 40 and 42 extending through the block 36. If I use wax to form the rods 30, 32 and 34 I heat the block to cause the wax to melt and run out of the channels 38, 40 and 42. When this is done, I subsequently wash the tunnels or channels with a solvent to clear them of any volatile hydrocarbons. Also, as is pointed out hereinabove, if a hydrocarbon is employed, I wash the tubes out with an organic solvent such, for example, as acetone in a suitable atmosphere. It will readily be apparent that the encapsulating step is carried out in such a way as leaves the ends of the rods 30, 32 and 34 exposed to the action of the solvent to permit formation of the channels 38, 40 and 42. This may be achieved in any convenient manner. For example, in one particular arrangement the walls of the mold in which encapsulation takes place are provided with recesses for receiving the ends of the rods 30, 32 and 34 during encapsulation.

Figures 3, 5, 7:
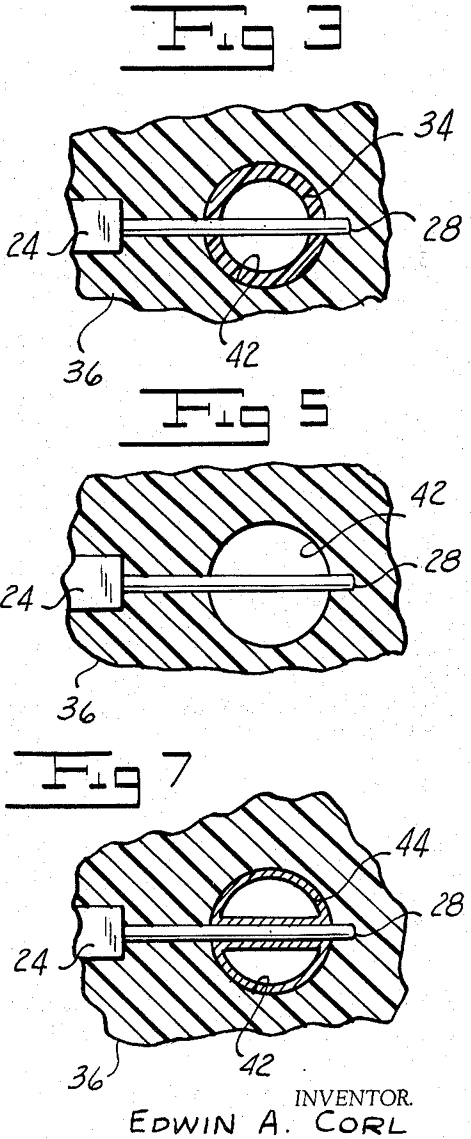
FIGURE 3 is a fragmentary view of the intermediate assembly illustrated in FIGURE 2.
FIGURE 5 is a fragmentary sectional view of the intermediate assembly illustrated in FIGURE 4.
FIGURE 7 is a fragmentary sectional view of the completed assembly shown in FIGURE 6, illustrating the manner in which the electrical connection is provided.

After the tubes or rods 30, 32 and 34 have been dissolved out of the block of encapsulating material 36 to form the tunnels 38, 40 and 42, I vapor-plate a conductive material over the the inside surfaces of the tunnels 38, 40 and 42. I may accomplish this operation in any suitable manner. For example, I apply a vacuum to a side of the block through which one end of a tunnel, or tunnels, passes. I then supply an organo-metallic or metal halide to the face of the block through which the other side of the tunnel passes. Thus the vapor is drawn through the tunnel and upon the application of heat, the metal-bearing compound disassociates to deposit conductive material over the inside surface of the tunnel. Specifically, as a plating compound I may use dicumene chromium which, at a temperature of around 300° C. produces a chromium metal deposit and cumene. Another example of a plating material which I may employ is nickel carbonyl. At a temperature of around 100° C. this compound disassociates into a metallic nickel deposit and carbon monoxide. After the metallic deposit is built up to the required thickness, the heat and gas are removed and the system can be flushed of plating compounds. As can best be seen by reference to FIGURE 7, the result of this operation is a metallic deposit 44 covering the inner surface of each of the tunnels 38, 40 and 42 to provide electrical connections to leads such as the lead 28 which passes through the tunnel 42.

Figure 8:
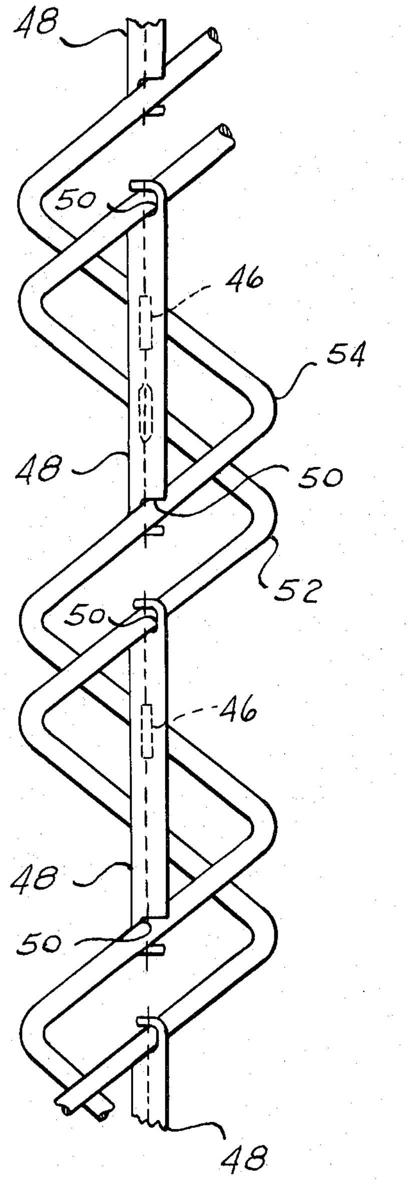
FIGURE 8 is an elevation of an alternate form of electrical circuit to which my method can be applied.

My method is applicable to other forms of electrical components. For example, as shown in FIGURE 8, microcircuit components 46 can be sealed in glass tubes 48 and provided with electrical conductors 50 extending out of the tubes and supported on both ends. A number of microcircuits, such as the circuit 46, can be interconnected by spiralling a rod or tube, such as the tube 52, to connect a corresponding end of each of the microcircuits 46. A second spiral rod or tube 54 can be employed to connect the other ends of the elements with the result that all the micro components 46 are connected in parallel. It will readily be understood that connections to other circuit components can be made at any point along the spiral tubes 52 and 54. The finished assembly can be encapsulated and provided with conductors in the manner described above in connection with FIGURES 1 to 7.

Figure 9:
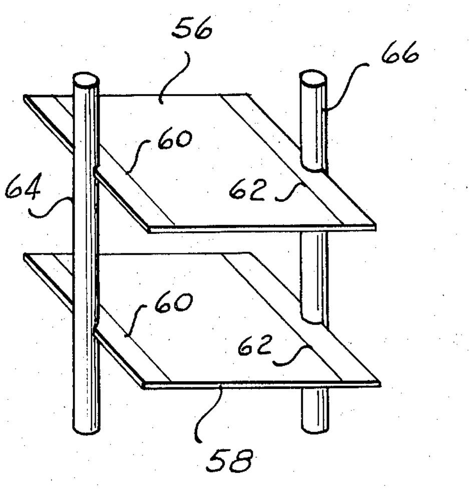
FIGURE 9 is a perspective view of yet another form of electrical circuit to which my method can be applied.

Referring now to FIGURE 9, I have shown yet another type of circuit component to which my method can be applied. A plurality of wafers 56 and 58 have connecting paths 60 and 62 which provide the required connections for the components carried by the wafers 56 and 58 in a manner known to the art. Since the wafers 56 and 58 themselves do not form a part of my invention, they will not be described in detail. In this form of assembly, I take rods or tubes 64 and 66 and slip them over the edges of the wafers 56 and 58 at points along the length of the conductive areas 60 and 62. When this has been done, suitable connections to any other circuit components can be made in the manner described above in connection with FIGURES 1 to 7. After the connections have been made, the resultant assembly is encapsulated, the rods 64 and 66 are dissolved out and conductive material is vapor-plated into the resulting tunnels.

In practicing my method to build up an assembly of components such as is shown in FIGURES 1 to 7, I first connect the leads of the various components 10, 18 and 24 in the desired manner by using the tubes or rods 30, 32 and 34. When this has been done, I coat this subassembly with a suitable plastic to preserve its electrical integrity during the encapsulating operation. I next encapsulate the connected components to the desired form such as a block of an appropriate encapsulating material 36. When this has been done, I dissolve the rods 30, 32 and 34 to form the tunnels 38, 40 and 42. After the tunnels have been washed, I vapor-plate conductive material over the inside surfaces of the tunnels by applying a vacuum to one end of each of the tunnels and supplying a suitable metallic compound to the other end. The metallic vapor is drawn through the tunnel and in response to heat, it disassociates to leave the metallic deposit 44 along the inside surface of each of the tunnels. In this manner, I complete my assembly of electrical components.

If it is desired to connect molecular circuit components, they may first be encapsulated in glass tubes as shown in FIGURE 8. Wafer components can be made a part of the assembly in the manner shown in FIGURE 9.

It will be seen that I have accomplished the objects of my invention. I have provided an improved assembly of electrical components which is more reliable than are assemblies of the prior art. My assembly is smaller and lighter than are assemblies of miniature electrical components of the prior art. My assembly does not require the use of solder, welding or crimping for its connections. I have provided a method of making assemblies of miniature electrical components which protects the components in the course of making the connections. My assembly and method overcome the defects of methods and assemblies of the prior art.

It will be understood that certain features and subcombinations are of utility and may be employed without reference to other features and subcombinations. This is contemplated by and is within the scope of my claims. It is further obvious that various changes may be made in details within the scope of my claims without departing from the spirit of my invention. It is, therefore, to be understood that my invention is not to be limited to the specific details shown and described.

Having thus described my invention, what I claim is:

1. A method of interconnecting electrical components having leads including the steps of selectively securing said leads to elongated elements in accordance with predetermined interconnections to form an assembly, encapsulating said assembly, removing said elongated elements from said encapsulated assembly to leave channels into which said leads extend and permanently depositing conductive material in said channels to form the desired predetermined electrical connections between said components.

2. A method of interconnecting electrical components having leads including the steps of selectively connecting said leads to elongated elements in accordance with predetermined interconnections to form an assembly, encapsulating said components and a portion of the material of said elongated elements to permit access to said material, dissolving said elements from the encapsulated assembly to form channels into which said leads extend and permanently positioning conductive material in said channels to form electrical connections between said components.

3. A method of interconnecting electrical components having leads including the steps of selectively securing said leads to elongated elements formed of a soluble material, said leads being secured to said elements in accordance with desired interconnections to form an assembly, encapsulating said conponents and a portion of the material of said elongated elements in an insoluble material to permit access to said soluble material, dissolving said elements from said encapsulated assembly to form channels into which said leads extend and permanently positioning conductive material in said channels to form the desired electrical connections between said components.

4. A method of interconnecting electrical components having leads including the steps of selectively securing said leads to elongated elements soluble in a given solvent, said leads being secured to said elements in accordance with desired interconnections to form an assembly, encapsulating said components and a portion of the material of said elongated elements in a material substantially insoluble in said solvent to permit access to said material, dissolving said elongated elements from said encapsulated assembly to form channels into which said leads extend and vapor depositing conductive material in said channels to form electrical connections between said components.

5. A method of interconnecting electrical components having leads including the steps of selectively securing said leads to elongated elements formed of a material adapted to melt at a given temperature, said leads being secured to said elements in accordance with desired interconnections to form an assembly, encapsulating said components and a portion of the material of said elongated elements in a material substantially resistant to heat at said temperature to permit access to said element material, subjecting said encapsulated assembly to heat at said temperature to melt said elements to form channels into which said leads extend and positioning conductive material in said channels to form electrical connections between said components.

References Cited by the Examiner

UNITED STATES PATENTS

| | | | |
|---|---|---|---|
| 1,147,789 | 7/1915 | Davenport. | |
| 2,913,632 | 11/1959 | Stanton | 317—101 |
| 2,942,302 | 6/1960 | Beyer | 18—59 |
| 3,005,131 | 10/1961 | Melcher et al. | 317—101 |
| 3,027,627 | 4/1962 | Strudy | 29—155.5 |
| 3,059,814 | 10/1962 | Poncel et al. | 9—316 X |
| 3,071,843 | 1/1963 | Horton | 29—155.5 |
| 3,084,391 | 4/1963 | Parstorfer | 18—59 |

WHITMORE A. WILTZ, *Primary Examiner.*

ARTHUR M. HORTON, JOHN F. CAMPBELL, *Examiners.*